Patented Sept. 18, 1951

2,568,656

UNITED STATES PATENT OFFICE 2,568,656

COPOLYMERS OF AN ISOOLEFIN AND A VINYL CYCLOOLEFIN

Charles I. Parrish, Stow, Ohio, assignor to The B. F. Goodrich Company, New York, N. Y., a corporation of New York No Drawing. Application March 2, 1946,
Serial No. 651,613

4 Claims. (Cl. 260—88.1)

This invention relates to novel polymeric materials particularly copolymers of an isoolefin and a vinyl cycloolefin and to a method of producing the same, and is especially concerned with the preparation of solid, high molecular weight, tough, plastic and elastic, rubbery copolymers of an isoolefin and a vinyl cycloolefin.

It has been disclosed in U. S. Patents 2,356,128, 2,356,129 and 2,356,130 that solid, high molecular weight, rubbery copolymers of a major proportion of an isoolefin such as isobutylene and a minor proportion of a conjugated diolefin such as butadiene-1,3, isoprene or dimethyl butadiene-1,3, may be prepared by low-temperature copolymerization utilizing a Friedel-Crafts type catalyst such as aluminum chloride dissolved in a low-freezing solvent such as ethyl chloride. Such copolymers are capable of being vulcanized (that is, of being converted from a plastic condition to a much stronger, more elastic state by heating with sulfur, preferably in presence of a vulcanization accelerator), but they suffer from the disadvantage, as compared to other commercial synthetic rubbers or to natural rubber, of requiring a considerably longer time of heating at a given temperature for completion of the vulcanization process.

Other isoolefin copolymers prepared by the low-temperature technique, some of which are said to be of a rubbery vulcanizable nature, have also been disclosed in U. S. Patents 2,322,073 and 2,384,975. In these copolymers the material copolymerized with the isoolefin, instead of being a conjugated diolefin, is a non-conjugated aliphatic diolefin having an isopropenyl group at one of both ends of the aliphatic chain, such as dimethyallyl or 2-methyl-hexadiene-1,5. This change in structure however is not accompanied by greater ease of vulcanization of the copolymer; in fact, from the disclosures of these patents it would appear to have the opposite effect.

I have now discovered that vinyl cycloolefins are copolymerizable at low temperatures with isomonoolefins such as isobutylene; that solid high molecular weight rubbery copolymers which are vulcanizable at a much faster rate than previously known isoolefin copolymers are obtainable thereby; and that numerous other advantages, as will appear hereinafter, both in the copolymerization process and in the character of the copolymeric products are secured by copolymerizing these materials. It is quite surprising that vinyl cycloolefins should copolymerize with isoolefins to yield a rubbery vulcanizable product since neither simple polymers of isoolefins nor simple polymers of ring-substituted vinyl compounds are vulcanizable, and it is even more unexpected that copolymers containing vinyl cycloolefins should be more readily vulcanizable than copolymers containing aliphatic conjugated diolefins since the double bonds in the latter are considered more reactive in character.

The vinyl cycloolefin which I prefer to copolymerize with an isoolefin in accordance with this invention is 1-vinyl-cyclohexene-3 (which may also be named 4-ethenyl-cyclohexene-1) which has the structure:

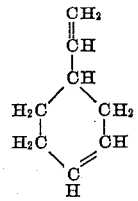

It is seen that this compound contains a vinyl (ethenyl) group attached to a saturated ring carbon atom (that is, a ring carbon atom connected by each of its valences to a different atom) present in an alicyclic hydrocarbon radical containing an endocyclic double bond. Other compounds of a similar nature are substantially equivalent to 1-vinyl-cyclohexene-3 in this invention and may also be utilized. As examples of these there may be mentioned 1-vinyl-4-methyl-cyclohexene-3; 1,3-dimethyl-1-vinyl-cyclohexene-3 (or 2,4-dimethyl-4-ethenyl-cyclohexene-1); 1-vinyl-cyclobutene-2; 2,2,3-trimethyl-1-vinyl-cyclopentene-3 (or 2,3,3-trimethyl-4-ethenyl-cyclopentene-1) and the like. Still other vinyl cycloolefins contemplated by this invention include those in which the vinyl group is attached to a ring carbon atom bearing a double bond such as 1-vinyl-cyclopentene-1; 1-vinyl-cyclohexene-1; 1-methyl-2-vinyl-cyclohexene-1 and the like, and those in which the vinyl group is attached to a ring carbon atom of an alicyclic hydrocarbon radical containing an endocyclic double bond and in addition thereto one or more other double bonds such as 1,3,3-trimethyl-6-vinyl-cyclohexadiene-1,4; 1,3,3,4-tetramethyl-6-vinyl-cyclohexadiene-1,4 and similar vinyl substituted cyclohexadienes, cyclopentadienes, cyclooctadienes, cyclooctatrienes and the like. In short any vinyl cycloolefin, that is, any hydrocarbon of the structure

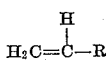

wherein R is an alicyclic hydrocarbon radical having its connecting valence on a ring carbon atom and comprising an endocyclic double bond, and preferably containing no more than 10 carbon atoms, or a mixture of more than one such material, may serve as the material to be copolymerized with an isoolefin.

Isobutylene (or isobutene) is the isoolefin ordinarily and preferably used in this invention but other aliphatic isoolefins containing but one double bond such as 2-methyl-butene-1; 2-ethyl-butene-1; 3-methyl-butene-1 etc. are substantially equivalent to isobutylene in the copolymerization described herein and may be substituted therefor in whole or in part. Generally it is desirable that the isoolefin contain less than 8 carbon atoms.

In the practice of the invention a hydrocarbon mixture is prepared containing the isoolefin, preferably isobutylene, and the vinyl cycloolefin preferably 1-vinyl-cyclohexene-3, the isoolefin being present, when it is desired to produce rubbery vulcanizable copolymers, in a major proportion by weight, preferably in a ratio of about 80 to 99 parts, with the vinyl cycloolefin in a minor proportion, preferably in a ratio of 1 to 20 parts. This hydrocarbon mixture is then brought to reaction temperature, which is below room temperature (i. e., below 25° C.) when solid copolymers are desired, and is ordinarily between about 0° C. and −150° C., more preferably between about −20° C. and −125° C., when rubbery solids are desired, and for obtainment of the best rubbery product is between about −75° C. and −125° C., by any suitable method as by addition of solid carbon dioxide (Dry-Ice) or by addition of a low-freezing (sufficiently low as to be liquid at reaction temperature) inert diluent or solvent such as liquid ethylene, liquid ethane, liquid methane, liquid propane, liquid butane, liquid methyl or ethyl chlorides or mixtures of these or the like, or by employing external cooling means as by confining the hydrocarbon mixture in the reaction chamber (or flowing it through a reaction tube) submerged in a suitable refrigerant such as liquid ethylene, liquid methane, liquid vinyl chloride or the like, or by a combination of these methods.

To effect the copolymerization of the isoolefin and vinyl cycloolefin, an olefin polymerization catalyst is brought into contact with the hydrocarbon mixture preferably while the latter is at reaction temperature. A preferred catalyst, when a rubbery vulcanizable copolymer is the desired product, consists of a Friedel-Crafts type metal halide catalyst such as aluminum chloride, bromide or iodide or uranium or titanium chloride dissolved in a solvent which is liquid at reaction temperature such as ethyl or methyl chloride or other low molecular alkyl halide or carbon disulfide or similar substance, but other Friedel-Crafts type catalysts, not necessarily in such a solution, as well as still other catalysts capable of polymerizing olefins may also be used, as will appear in more detail hereinafter. The catalyst is applied to the hydrocarbon mixture in any desired manner, preferred procedures being, when the preferred catalyst solution is used, to apply the solution to the hydrocarbon mixture either rapidly in a single operation or continuously over a time interval, or in a stepwise manner, the form of a stream or spray or mist and with efficient mixing of the hydrocarbon mixture and the catalyst solution.

When the hydrocarbon mixture is at reaction temperature and the catalyst is present, copolymerization of the isoolefin and vinyl cycloolefin takes place; the copolymerization is quite rapid at the preferred reaction temperature and with the preferred catalyst, and generally requires less than a few minutes reaction time to produce a solid copolymer. Since rubbery copolymers are more easily separated from the reaction vessel, and often possess more desirable properties, when only a portion of the total monomers have copolymerized, it is generally desirable when preparing such copolymers to terminate the copolymerization reaction before its completion. This may be accomplished conveniently when the preferred catalyst is used, by addition to the reaction mixture of a substantial quantity of a material which quenches or destroys the catalytic properties of the catalyst such as ordinary 95% ethyl alcohol, ethylene glycol monoethyl ether, acetone or other of the various alcohols, ethers, esters and ketones, it being also convenient at this time to stabilize the copolymer against subsequent oxidation or deterioration by dissolving an antioxidant such as phenyl beta-naphthylamine or the like in the catalyst quenching or destroying agent used. Partial if not complete termination of the copolymerization may also be accomplished in some instances by physically removing the solid copolymer formed from the unreacted monomers, and solvent or diluent if one is present, at the temperature of reaction; by cessation of catalyst addition; or by raising the temperature, and such expedients may then be followed, if desired, by treatment with the catalyst quenching agent.

After the copolymerization, the reaction mixture is treated to recover the copolymeric product. In the preparation of solid rubbery copolymers by the preferred procedure described, this involves nothing more than the separation of the solid copolymer from liquid materials such as unreacted monomers, solvents or diluents, quenching agents, etc., and from catalyst decomposition products, and is accomplished by stripping off volatile materials with the use of steam if necessary, and by washing and drying of the solid copolymer. The rubbery solid copolymer is then ready for further processing and use in the manner customary in the rubber factory.

The process described for the preparation of copolymers of an isoolefin and a vinyl cycloolefin, may be carried out batchwise or it may be made continuous with recycling of recovered materials used in the process, as will be apparent to those skilled in the art.

The following specific examples illustrate in greater detail the preferred process for preparing rubbery copolymers of an isoolefin and a vinyl cycloolefin.

*Examples 1 to 12*

In these examples mixtures of isobutylene and 1-vinyl-cyclohexene-3 are copolymerized at low temperature in the presence of a catalyst consisting of aluminum chloride dissolved in ethyl chloride, to form rubbery copolymers by the following general procedure: Isobutylene is condensed in a vessel cooled externally by Dry-Ice acetone or liquid nitrogen and varying amounts of 1-vinyl-cyclohexene-3 added to the liquid isobutylene. The resulting hydrocarbon mixture is then brought to reaction temperature by further external cooling of the vessel or if necessary, by addition of Dry-Ice to the mixture to serve as an internal refrigerant. Catalyst solution (prepared by mixing anhydrous aluminum chloride and ethyl chloride at low temperature—below 0° C.—and warming to room temperature for complete solution to take place) is then added to the hydrocarbon mixture in small portions over a period of about 40 to 120 minutes with stirring of the mixture and while maintaining its temperature at the desired level. During the addition of catalyst solution a portion (from about 10 to 40% by weight) of the isobutylene and vinyl cyclohexene copolymerize to form a solid rubbery material which separates in the form of white flakes from the liquid mixture. The reaction mixture is then treated with ethyl alcohol to quench the catalyst and allowed to warm to room temperature whereupon most of the ethyl chloride and unreacted isobutylene are volatilized. After removing the alcohol by distillation the unreacted vinyl cyclohexene is removed by distillation with steam leaving the solid rubbery copolymer which is then washed and dried. The quantity of isobutylene (I-Bu) and 1-vinyl-cyclohexene-3 (1-VC-3) in the hydrocarbon mixture in parts by volume (the parts by weight may be calculated by multiplying by the density), the percent by weight of 1-vinyl-cyclohexene-3 in the mixture, the quantity of aluminum chloride and ethyl chloride in the catalyst solution, the temperature of reaction, the time of reaction, the percent yield of copolymer, the percent of 1-vinyl-cyclohexene-3 in the copolymer (determined from the quantity of recovered unpolymerized material) and the general nature of the copolymer, for each of the several examples are shown in the following tabulation:

izable copolymer. This is in marked contrast to the results obtained by copolymerizing isobutylene with monomers disclosed in the prior art (such as butadiene, isoprene, dimethyl butadiene and methyl hexadiene) since with these materials the percent of copolymerized diene is smaller or at best equal to that in the original mixture.

Examples 1 to 4 indicate the effect of varying the temperature of polymerization. At the lower temperatures more vinyl cycloolefin enters into the copolymer when polymerization is carried to the same yield; and the product is tougher and with higher molecular weight. It should be noted however that the examples show that rubbery products are obtained at temperatures as high as −23° C. (such products are also obtained at temperatures as high as 0° C.). This also contrasts with the results obtained by copolymerizing isobutylene with butadiene, isoprene or the like since with such materials even the temperature of −44° C. is not sufficiently low to give rise to a strong, rubber product.

Examples 5 to 7 show the effect of varying the ratio of vinyl cyclohexene and isobutylene in the original hydrocarbon mixture. Since a tough rubbery material with sufficient copolymerized vinyl cyclohexene to be readily vulcanizable is obtained with from 1 to 5% by weight of vinyl cyclohexene in the reaction mixture, there is no great advantage in using more than this amount although higher amounts up to as

| Example No. | Hydrocarbon Mixture | | | Catalyst Solution | | | Temp., °C. | Time, Minutes | Copolymer Product | | |
|---|---|---|---|---|---|---|---|---|---|---|---|
| | Parts I-Bu by vol. | Parts 1-VC-3 by vol. | Per Cent by weight 1-VC-3 | Parts AlCl₃ by wt. | Parts EtCl by wt. | Per Cent by weight AlCl₃ | | | Per Cent Yield | Per Cent by weight 1-VC-3 in Copolymer | Nature |
| 1 | 720 | 20 | 3.6 | 0.30 | 25.0 | 1.2 | −23 | 65 | 25.7 | 5.8 | soft rubbery solid. |
| 2 | 720 | 20 | 3.6 | 0.30 | 25.0 | 1.2 | −50 | 80 | 17.1 | 4.7 | Do. |
| 3 | 720 | 20 | 3.6 | 0.30 | 25.0 | 1.2 | −71 | 70 | 26.2 | 8.0 | sticky rubbery solid. |
| 4 | 720 | 20 | 3.6 | 0.30 | 25.0 | 1.2 | −100 | 58 | 17.7 | 7.4 | tough rubbery solid. |
| 5 | 720 | 5 | 1.0 | 0.38 | 33.0 | 1.2 | −100 | 35 | 18.0 | 4.9 | Do. |
| 6 | 720 | 10 | 1.9 | 0.30 | 25.0 | 1.2 | −100 | 67 | 23.0 | 4.4 | Do. |
| 7 | 720 | 40 | 7.2 | 0.30 | 25.0 | 1.2 | −100 | 63 | 20.8 | 12.2 | Do. |
| 8 | 720 | 20 | 3.6 | 0.06 | 51.0 | 0.1 | −23 | 115 | 5.0 | 35.9 | soft rubbery solid |
| 9 | 720 | 20 | 3.6 | 0.30 | 51.2 | 0.6 | −23 | 151 | 11.0 | 6.0 | Do. |
| 10 | 720 | 20 | 3.6 | 1.20 | 50.1 | 2.4 | −23 | 128 | 37.0 | 4.8 | Do. |
| 11 | 720 | 20 | 3.6 | 0.36 | 15.1 | 2.4 | −100 | 41 | 21.6 | 5.7 | tough rubbery solid. |
| 12 | 720 | 20 | 3.6 | 0.39 | 5.0 | 7.2 | −100 | 41 | 11.6 | 13.9 | Do. |

It is apparent from these examples that considerable variations in the quantities of isoolefin and vinyl cycloolefin employed, in the amount and concentration of catalyst used and in the temperature of polymerization are possible while still obtaining a rubbery solid product.

Of especial significance is the fact that the percent of copolymerized vinyl cyclohexene in the copolymer product is appreciably greater than in the original hydrocarbon mixture, and varies not only with the composition of the hydrocarbon mixture but also with the concentration of catalyst, temperature of reaction, and percent yield or extent of polymerization. This makes it possible to obtain copolymers containing from 1 to 50% of copolymerized vinyl cyclohexene from hydrocarbon mixtures in which the vinyl cyclohexene percentage is only about $\frac{1}{10}$ to ½ as large. Since the copolymerized vinyl cyclohexene provides unsaturation in the copolymer and since the amount of unsaturation is largely determinative of the ease of vulcanization of the copolymer, other factors being constant, it is evident that the use of even small amounts of vinyl cyclohexene produces a readily vulcanmuch as about 50% by weight may be used while still obtaining a rubbery product.

In Examples 8 to 12 variations in the quantity and concentration of the catalyst solution are illustrated. It is seen that in general the more catalyst used the faster the reaction but that an increase in concentration of the aluminum chloride in the ethyl chloride solution decreases the yield and increases the amount of copolymerized vinyl cyclohexene in the copolymer. Thus, the quantity and concentration of the catalyst are not critical, but it is generally preferred to employ from 0.001 to 1% by weight of aluminum chloride based on the hydrocarbon mixture in sufficient ethyl chloride to yield a solution having a concentration of aluminum chloride of about 0.1 to 10% by weight.

The nature and properties of the preferred rubbery copolymers of this invention are further illustrated in the following examples.

*Example 13*

A mixture consisting of 97% isobutylene and 3% 1-vinyl cyclohexene-3 is copolymerized at −100° C. by addition thereto of a catalyst solution consisting of a 1.2% solution of aluminum chloride in ethyl chloride, in the manner of the preceding examples. The product is a tough solid rubbery copolymer.

The copolymer is milled for 10 minutes on a corrugated roll mill, then sheeted by milling on a smooth mill for an additional 5 minutes, all the while exhibiting excellent milling behavior and finally forming a smooth sheet of excellent appearance. It is then compounded in the following recipe:

| | Parts |
|---|---|
| Copolymer | 100.0 |
| Zinc oxide | 5.0 |
| Stearic acid | 3.0 |
| Mercaptobenzothiazole | 0.5 |
| Tetramethyl thiuram disulfide | 1.0 |
| Sulfur | 2.0 |
| Channel black | 50.0 |

The compounded copolymer composition is then heated for 30 minutes at 280° F. whereupon there is obtained a well vulcanized composition having an ultimate tensile strength over 2,000 lbs./sq. in., an ultimate elongation of over 800% and a modulus of elasticity of 300% elongation of over 500 lbs./sq. in.

For purpose of comparison a commercial iso-olefin-diolefin copolymer, believed to be a copolymer of isobutylene and isoprene, is treated in the same manner. This material forms a somewhat rougher appearing sheet on milling, and the compounded composition is far from completely vulcanized by heating for 30 minutes at 280° F., it then possessing an ultimate tensile strength of 1400 lbs./sq. in and a 300% modulus of elasticity of 100 lbs./sq. in. However, when heated for 60 minutes at 280° F. it develops a tensile strength over 2,000 lbs./sq. in. It is thus apparent that the isobutylene vinyl cyclohexene copolymer of this invention vulcanizes much more rapidly than known rubbery isoolefin copolymers.

In another test of the rate of vulcanization, a sample of a compounded isobutylene vinyl cyclohexene copolymer and a similarly compounded commercial isobutylene isoprene copolymer are subjected to a "scorch test" using a Mooney viscosity machine with a large rotor and measuring the time required for the Mooney reading to reach a "plateau," the time at the "plateau" and the time for subsequent increase of 25 on the Mooney scale. The results for the two copolymers are as follows:

| | Isobutylene 1-VC-3 Copolymer | Isobutylene Isoprene Copolymer |
|---|---|---|
| | Minutes | Minutes |
| Time to plateau | 3.5 | 5.0 |
| Time at plateau | 1.0 | 1.0 |
| Time to ML-25 | 1.5 | 3.0 |
| Total Time | 6.0 | 9.0 |

This test again demonstrates the faster rate of vulcanization of the isobutylene vinyl cyclohexene copolymer.

Examples 14 and 15

In these examples mixtures of 97% isobutylene and 3% 1-vinyl cyclohexene-3 are copolymerized in the manner of the preceding examples using aluminum chloride dissolved in ethyl chloride as the catalyst at a temperature of −85° C. (Example 14) and at a temperature of −115° C. (Example 15). Tough rubbery copolymers are obtained in each case. The copolymer obtained at −115° C. is completely insoluble in the unreacted monomers at the temperature of reaction while the copolymer obtained at −85° C. is only partly insoluble in the unreacted monomers at the temperature of reaction. Both copolymers are soluble in hydrocarbons generally at higher temperatures to produce viscous cements, thereby differing from copolymers of isobutylene and non-conjugated diolefins such as dimethallyl which are insoluble in such solvents. Both copolymers possess molecular weights considerably above 100,000, the copolymer prepared at −115° C. having a molecular weight above 200,000. When the copolymers are plasticized in an internal mixer at about 100–150° C. for 1 to 3 hours their molecular weights are reduced somewhat but are still in the neighborhood of about 100,000 or higher.

When these copolymers are allowed to stand in the cold for prolonged periods of time they do not exhibit "cold flow" which is characteristic of commercial iso-olefin-diolefin copolymers and when they are vulcanized the vulcanizates do not "grow" when subjected continuously to tension as do articles made from commercial iso-olefin-diolefin copolymers. They possess iodine numbers of about 5 to 10, and when vulcanized they are almost completely saturated and hence are highly resistant to oxygen and ozone, chemicals etc. Because of these and other properties and the ability to be vulcanized rapidly by heating the sulfur or other vulcanizing agent, they are highly useful in the production of articles of all kinds customarily made from rubber or synthetic rubber. One of their presently most important fields of application is in the production of inner tubes, where they are far superior to any other known material.

The examples described hereinabove are directed to the production of solid rubbery copolymers of isobutylene and 1-vinyl-cyclohexene-3 which copolymers contain a major proportion of combined isobutylene and a minor proportion of combined vinyl cyclohexene, and are characterized by possessing a high molecular weight (above 15,000), by possessing low unsaturation (an iodine number below 50) and by being rapidly vulcanizable to a stronger more elastic condition. Similar copolymers in which isobutylene is replaced completely or in part by other isomonoolefins and in which the 1-vinyl-cyclohexene-3 is replaced completely or in part by other vinyl cycloolefins, are prepared in the same manner and are similarly characterized. In addition copolymers containing other copolymerizable material, for example, a minor proportion of some other diolefin such as butadiene-1,3-isoprene, dimethyl butadiene-1,3, etc., in addition to the isoolefin and vinyl cycloolefin are also rubbery materials and are prepared by including such materials in the reaction mixture.

While such rubbery vulcanizable copolymers are the preferred copolymers of this invention because of their wide field of usefulness, the invention is not limited thereto for many other copolymers of a solid resinous nature or of a liquid or semi-liquid character may be prepared from an isoolefin and a vinyl cycloolefin and are included in the general scope of this invention. In preparing such other copolymers it is not necessary that the preferred copolymerization process, including the preferred proportion of isoolefin and vinyl cycloolefin, the preferred catalysts and the preferred temperature ranges, be utilized but rather any copolymerization process is effective.

Thus, mixtures of isoolefin and vinyl cycloolefin within the entire range of proportions may be copolymerized. When proportions of from 1 to 50 parts of an isoolefin with 50 to 99 parts of a vinyl cycloolefin are utilized and the temperature of polymerization is low (below room temperature) the products are generally clear solid resins of high viscosity and considerable flexibility and tackiness, which are useful in the preparation of coating compositions and adhesives.

At higher temperatures say from about 25 to 100° C. or even 200° C., copolymers prepared from mixtures of isoolefins and cycloolefins within the entire range of proportions are generally liquids or semi-solids which are valuable additions to lubricating oils and are useful in preparing coatings, etc.

The catalyst employed to effect the copolymerization of an isoolefin and a vinyl cycloolefin may be any of the broad class of olefin polymerization catalysts, that is any catalyst which when contacted with an olefin causes polymerization thereof. A preferred sub-group of catalysts in this class comprises the Friedel-Crafts type catalysts including boron trifluoride, antimony chloride, iron chloride, tin chloride and zinc chloride as well as the halides of aluminum, uranium and zirconium, and complexes of any of these with inorganic polar compounds such as sodium chloride or other alkali or alkaline earth metal halide, water, hydrogen halides and organic polar compounds such as the various nitro compounds, organic halides, ethers, esters, ketones and sulfones. Such catalysts are preferably used whenever the copolymerization is conducted at temperatures below room temperature and especially below 0° C. Other catalysts which are quite useful include strong acid catalysts and their anhydrides such as hydrofluoric acid, fluoroboric acid, sulfuric acid, orthophosphoric acid, alkyl sulfuric acids, sulfonic acids, phosphorus pentoxide and the like and activated clays such as fuller's earth, diatomaceous earth, alumina, bauxite, etc., preferably calcined at 100 to 500° C. before use. The acidic catalysts are preferably used at temperatures of about 25 to 100° C. and the activated clays at temperatures of 25 to 200° C. With these latter catalysts the copolymerization often requires a considerably longer time than with Friedel-Crafts type catalysts and may require as long as 2 to 24 hours.

The use of vinyl cycloolefins to copolymerize with isoolefins is advantageous not only in the production of rubbery solid copolymers but also in the production of liquid and resinous copolymers since all such copolymers possess properties not found in polymers of isoolefins alone.

Accordingly, this invention provides a whole new class of useful polymeric materials and a method for producing them. It is not intended therefore that the invention be limited except by the spirit and scope of the appended claims.

I claim:

1. The process of preparing a solid sulfur vulcanizable copolymer of a major proportion of an isoolefin and a minor proportion of a vinyl cycloolefin which comprises treating a hydrocarbon mixture containing 80 to 99 parts by weight of an isoolefin having from 4 to 5 carbon atoms and 1 to 20 parts of a vinyl cycloolefin of the structure

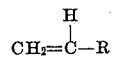

wherein R is an alicyclic hydrocarbon radical containing from 4 to 10 carbon atoms from 4 to 6 of which are present in an alicyclic ring, having its connecting valence on a ring carbon atom, and containing a carbon to carbon double bond between two ring carbon atoms, at a temperature between —20 and —150° C. with a catalyst solution consisting of a Friedel-Crafts metal halide catalyst dissolved in a low freezing organic solvent which is liquid at the reaction temperature.

2. The process of claim 1 wherein the isoolefin is isobutylene.

3. The process of claim 2 wherein the vinyl cycloolefin is 1-vinyl-cyclohexene-3.

4. The process of preparing a solid, tough, millable copolymer of a major proportion of isobutylene and a minor proportion of 1-vinyl-cyclohexene-3, said copolymer being characterized by a molecular weight above 100,000, an iodine number below 50, and the ability rapidly to be vulcanized with sulfur to a strong elastic condition, which comprises treating a mixture of isobutylene and 1-vinyl-cyclohexene-3 at a temperature between —75 and —125° C. with a catalyst solution consisting of anhydrous aluminum chloride dissolved in ethyl chloride.

CHARLES I. PARRISH.

REFERENCES CITED

The following references are of record in the file of this patent:

UNITED STATES PATENTS

| Number | Name | Date |
| --- | --- | --- |
| 2,356,128 | Thomas et al. | Aug. 22, 1944 |
| 2,373,706 | Ott | Apr. 17, 1945 |
| 2,475,234 | Gleason et al. | July 5, 1949 |

FOREIGN PATENTS

| Number | Country | Date |
| --- | --- | --- |
| 516,931 | Great Britain | Jan. 16, 1940 |